Patented June 10, 1941

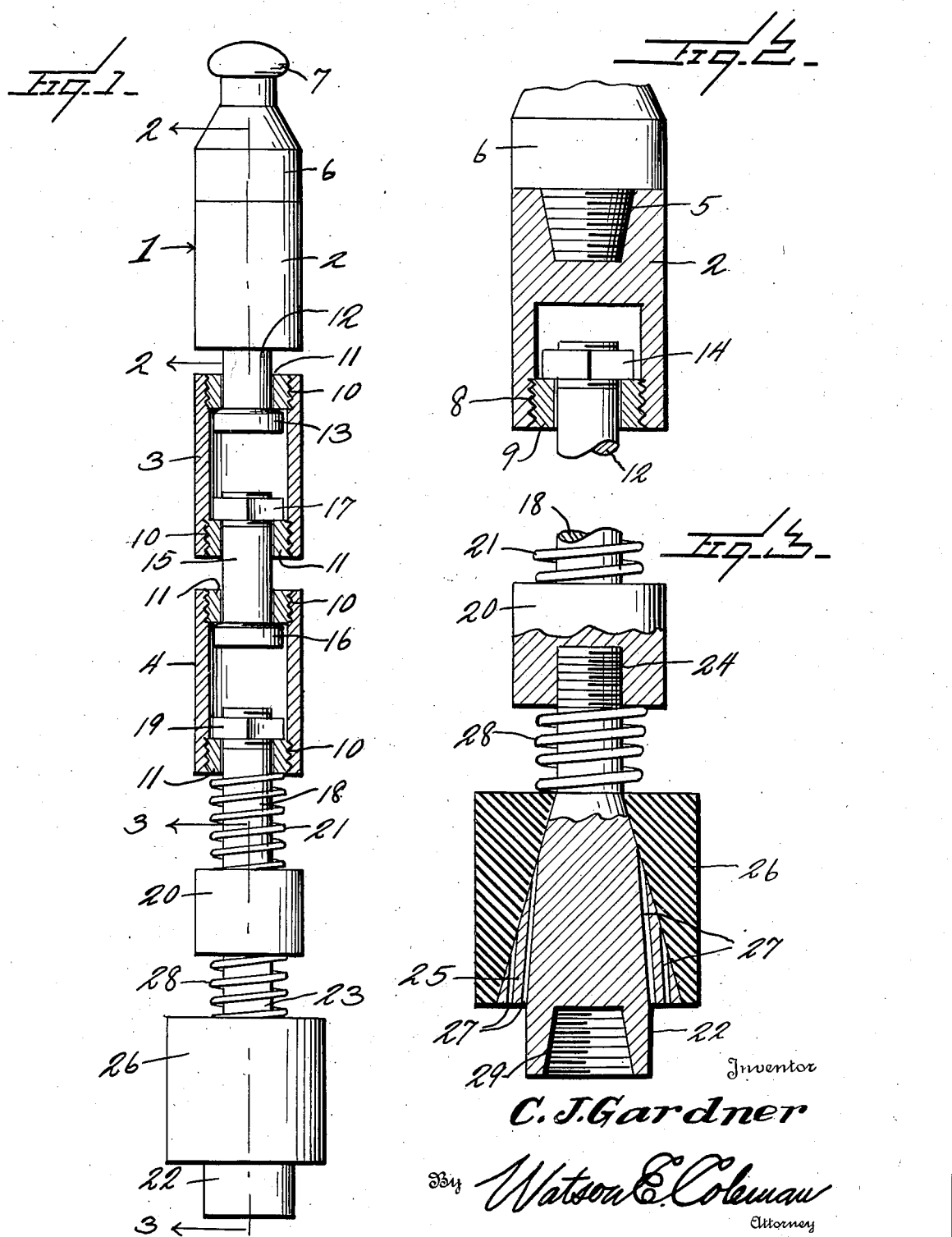

2,245,128

UNITED STATES PATENT OFFICE 2,245,128

DRILL PIPE CLEANER OR DRIER

Charles J. Gardner, Bakersfield, Calif., assignor of one-half to Aram Peter Ohanneson, Shafter, Calif.

Application July 2, 1940, Serial No. 343,664

10 Claims. (Cl. 166—18)

This invention relates generally to devices used in connection with well drilling and pertains particularly to devices for cleaning the drill pipe.

In drill pipe cleaners or driers of the character at present in use, difficulty is frequently encountered in the use of the cleaner where the drill pipe may be flattened, bent or have an obstruction therein, because of the fact that the cleaner is not designed to accommodate itself to such bends or flattened portions but is, on the other hand, of rigid form and, therefore, readily becomes fixed or stuck when a flattened or bent section of the pipe is encountered. Difficulty is also encountered where some obstruction is in the pipe by reason of the fact that the wiping rubber or washer does not yield and no provision is made for applying a jarring force which would tend to move the cleaner past the obstruction.

The present invention has for its primary object to provide a drill pipe drier or cleaner of an articulated construction which will permit the cleaner to conform to bends or angles in the pipe whereby the cleaner will pass through and effectively perform its function of cleaning out the mud and water therefrom.

Another object of the invention is to provide an improved drill pipe cleaner or drier which is designed in such a manner that a jarring action will be obtained to force the wiping rubber or washer through the pipe in the event that the rubber encounters an obstruction.

Still another object of the invention is to provide a pipe cleaner or drier in which the rubber washer or wiper is yieldably carried thereby permitting the rubber to give way upon meeting an obstruction in the pipe whether it be a bend in the pipe, a flatness therein or some body which has lodged in the pipe to form an obstruction.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the tool, portions of the same being in longitudinal section.

Fig. 2 is a sectional view on an enlarged scale taken on the line 2—2 of Fig. 1.

Fig. 3 is a sectional view on an enlarged scale taken on the line 3—3 of Fig. 1.

Referring now more particularly to the drawing, the numeral 1 generally designates the body of the cleaner embodying the present invention. This body is made up of a plurality of cylindrical units here indicated as being three in number and designated by the numerals 2, 3 and 4. However, it is to be understood that the invention is not to be limited to this number of units as a greater or lesser number may be employed, if desired.

The upper unit 2 of the body is provided in its upper end with a threaded tool joint 5 to which is detachably connected the head 6 formed to provide a knob 7 to be engaged by a fishing or retrieving tool. The lower end of the unit 2, which is tubular, is interiorly threaded, as indicated at 8, to receive a ring nut 9. Both ends of the units 3 and 4, which may be termed the intermediate units and which are tubular as shown, are interiorly threaded, as indicated at 10, and in each of the threaded ends of these units are ring nuts 11.

Extending through the adjacent ring nuts 9 and 11 of the units 2 and 3 is a coupling bolt 12, the head 13 of which is disposed at the inner side of one ring nut while the nut 14, which is carried upon its other end, is disposed upon the inner side of the other ring nut and within the adjacent unit. In the illustration of the invention, the nut 14 is disposed within the unit 2 and the head of the bolt is disposed within the unit 3, but obviously the bolt might be reversed, if desired.

Connecting the units 3 and 4 is a coupling bolt 15 similar to the bolt 12, and this bolt has the head 16 upon one end disposed within a unit, here shown as the unit 4, while upon its opposite end the nut 17 is disposed within the unit 3 upon the inner side of the other ring nut 11.

Extending through the ring nut 11 which is in the end of the unit 4 opposite from the bolt 15 is a jarring pin 18, which carries upon its inner end the nut 19 whereby it is coupled with the unit 4. Upon its other end the pin 18 has a jar head 20 and encircling the pin 18 and interposed between the jar head 20 and the adjacent end of the unit 4 is an expansion spring 21.

The numeral 22 designates the cleaner rubber carrying body from which there extends at one end the threaded shank 23 which at its free end is threadably engaged in the jar pin head 20 coaxial with the pin 18, the threaded connection referred to being indicated by the numeral 24.

The rubber supporting body 22 has the cone-like shoulder portion 25 upon which the cleaner rubber, which is indicated generally by the numeral 26, rests. The rubber, as shown, is interiorly tapered to fit over the cone body 25 so that when the rubber is in its down position, it completely encloses the tapered shoulder.

The tapered shoulder or cone-like body is provided with a plurality of fluid passages 27 which lead upwardly from its lower end and open through the inclined or tapered surface thereof. The open upper ends of these passages are covered by the rubber body when the latter is resting upon the supporting shoulder and it will be readily seen that when the tool is passing downwardly through a pipe line, the fluid in the line will pass upwardly through the passages 27 and escape between the tapered shoulder and the rubber body and force the rubber body to expand so as to maintain a firm wiping contact with the wall of the pipe.

The wiping rubber 26 is maintained yieldably in spaced relation with the jar pin head 20 by the expansion spring 28 which encircles the stem 23 and is interposed between the rubber and the head, as shown.

The lower end of the rubber supporting body is provided with a tool joint 29 to facilitate the attachment to the tool of a weight of a desired size if the use of such a weight is necessary for the proper operation of the cleaner.

The heads of the bolts 12 and 15 which couple the sections of the tool together are rounded as shown, upon their upper and lower surfaces. This provides for the desired free swivel action between the joints of the tool.

In use, the tool is dropped into the drill pipe without having a line connected therewith, just before the operation of withdrawing the drill pipe is commenced. When the last section of the drill pipe is brought to the surface, the cleaner tool can then easily be withdrawn from the last section by means of a fishing tool.

From the foregoing, it will be readily obvious that the cleaner embodying the present invention will, when in operation, readily pass bends in the pipe which would stop the operation of the ordinary cleaner unit, because of the articulated character of the present cleaner. It will also be readily obvious that by reason of the jarring means provided by the connection between the lower unit 4 and the jar pin head 20, if an obstruction is encountered by the rubber, the head will move back against the tension of the spring until the weight of the overlying structure comes into forcible contact with the compressed spring and the head 20, thus imparting a jar to the rubber and also, upon recoil of the spring, imparting a thrusting action which will tend to force the rubber past any slight obstruction which it may encounter. At the same time, the rubber may also move back to some extent by the yield of the buffer spring 28, the reaction of this spring combining with that of the spring 21 to give the desired forward thrust which will tend to move the rubber past any obstruction which may be encountered.

What is claimed is:

1. A well pipe cleaner, comprising an elongated body adapted to move longitudinally through the pipe and comprising a plurality of articulated members, a pipe wall engaging cleaning rubber connected with one of the members upon one end of the body, and a weight disposed between the rubber and the said one of the members.

2. A well pipe cleaner, comprising an elongated body adapted to move longitudinally through the pipe and comprising a plurality of articulated members, a pipe wall engaging cleaning rubber connected with one of the members upon one end of the body, and spring means by which a limited restrained movement of the rubber may be had in one direction longitudinally of the body.

3. A well pipe cleaner, comprising an elongated body adapted for insertion into the pipe, comprising a number of units loosely coupled together, means attached to one end unit facilitating the attachment of a fishing tool to the cleaner, means operatively coupled to the other end unit facilitating the attachment of a weight to the body, a wiper rubber interposed between said last means and the said other end unit and having limited movement longitudinally of the body, and resilient means resisting the said movement of the rubber.

4. A well pipe cleaner, comprising an elongated body adapted for insertion into the pipe, comprising a number of units loosely coupled together, means attached to one end unit facilitating the attachment of a fishing tool to the cleaner, means operatively coupled to the other end unit facilitating the attachment of a weight to the body, means connected with the said other end unit between the same and said weight connecting means providing a jar coupling, a wiper rubber interposed between the jar coupling and the weight connecting means, and resilient means resisting movement in one direction of the rubber and weight connecting means, said rubber and weight connecting means having limited movement longitudinally of the body against the resilient means.

5. A well pipe cleaner, comprising an elongated body made up of a plurality of units loosely coupled together, means connected with one end unit facilitating the attachment of a fishing tool to the cleaner, a pin loosely connected with the other end unit for limited longitudinal movement, a head carried by said pin, a spring encircling the pin between the head and the adjacent end unit, a stem connected at one end with said head to extend longitudinally of the body, a wiper rubber carried by the stem and adapted to have longitudinal movement thereon, and a spring interposed between the wiper rubber and said head.

6. A well pipe cleaner, comprising an elongated body including a plurality of cylindrical units, said units having their adjacent ends provided with interior screw threads, a ring nut threaded into the threaded end of each unit, bolts extending through adjacent ring nuts and operatively coupled therewith to join the adjacent units together, an end one of said units having its free end provided with a ring nut, a jar pin extending through said last ring nut and operatively coupled therewith, said jar pin having a head upon its free end, a spring interposed between the jar pin head and the adjacent ring nut, a stem threadably secured at one end in the jar pin head to extend coaxially with the pin, a cleaner rubber carried by and encircling said stem and having longitudinal movement thereon, and a spring interposed between the rubber and the head for normally urging the rubber away from the head.

7. A well pipe cleaner, comprising an elongated body including a plurality of cylindrical units, said units having their adjacent ends provided with interior screw threads, a ring nut threaded into the threaded end of each unit, bolts extending through adjacent ring nuts and operatively coupled therewith to join the adjacent units together, an end one of said units having its free end provided with a ring nut, a jar pin extending through said last ring nut and operatively coupled therewith, said jar pin having a head upon its free end, a spring interposed between the jar pin head and the adjacent ring nut, a stem threadably secured at one end in the jar pin head to extend coaxially with the pin, a cleaner rubber carried by and encircling said stem and having longitudinal movement thereon, and a spring interposed between the rubber and the head for normally urging the rubber away from the head, and means for effecting the expansion of the rubber during the downward progression of the tool in the well pipe.

8. A well pipe cleaner, comprising an alongated body designed to be inserted longitudinally into a pipe, means at one end of the body facilitating the attachment of a fishing tool to the cleaner, means at the opposite end of the body providing a longitudinally extending stem, a tapered shoulder carried by the stem, a cleaner rubber in the form of a cylindrical body having a downwardly tapering interior bore for the reception of said shoulder, the rubber body normally resting upon said shoulder, and said shoulder having fluid receiving passages opening through its lower side and extending upwardly and opening through the tapered surface thereof toward the encircling rubber body.

9. A well pipe cleaner, comprising an elongated body designed to be inserted longitudinally into a pipe, means at one end of the body facilitating the attachment of a fishing or retrieving tool to the cleaner, means at the opposite end of the body providing a longitudinally extending stem, a tapering shoulder formed about said stem, a cylindrical cleaner rubber encircling the stem and having an interior form corresponding with the taper of said shoulder whereby the cleaner rubber may receive said shoulder and be supported thereon, said shoulder having fluid receiving passages extending therethrough longitudinally thereof and opening at their lower ends through the bottom part of the shoulder and opening at their upper ends through the inclined surface of the shoulder toward the rubber body, said rubber body being supported for limited movement longitudinally of the stem, and spring means encircling the stem and bearing against the rubber and normally opposing said movement.

10. A well pipe cleaner, comprising an elongated body adapted to move longitudinally through the well pipe and comprising a plurality of articulated members, a pipe wall engaging cleaning rubber connected with one of the members upon one end of the body, a weight disposed between the rubber and the said one of the members, and yielding means between said weight and the said one member resisting movement of the latter member and weight toward one another.

CHARLES J. GARDNER.